United States Patent
Guo et al.

(10) Patent No.: US 7,976,323 B2
(45) Date of Patent: Jul. 12, 2011

(54) STACKED CARD CONNECTOR

(75) Inventors: Jing-Jie Guo, Shenzhen (CN); Wei-Ping Liu, Shenzhen (CN); Yun-Jen Lee, Tu-Cheng (TW)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 0 days.

(21) Appl. No.: 12/633,826

(22) Filed: Dec. 9, 2009

(65) Prior Publication Data

US 2010/0144179 A1 Jun. 10, 2010

(30) Foreign Application Priority Data

Dec. 10, 2008 (CN) .......................... 2008 1 0306070

(51) Int. Cl.
*H01R 13/62* (2006.01)
(52) U.S. Cl. ...................................................... 439/159
(58) Field of Classification Search .................. 439/159, 439/160, 541.5, 630, 636, 152
See application file for complete search history.

(56) References Cited

U.S. PATENT DOCUMENTS

| | | | |
|---|---|---|---|
| 6,857,907 B1 | 2/2005 | Hung et al. | |
| 7,114,993 B2 | 10/2006 | Chen | |
| 7,841,895 B2* | 11/2010 | Zhu et al. | .................. 439/541.5 |
| 7,871,298 B2* | 1/2011 | Guo et al. | ...................... 439/630 |
| 2002/0045375 A1* | 4/2002 | Suzuki | ......................... 439/326 |
| 2006/0178045 A1* | 8/2006 | Ting | ........................... 439/541.5 |
| 2007/0243744 A1* | 10/2007 | Yang et al. | .................... 439/326 |
| 2008/0268684 A1* | 10/2008 | Ting | .............................. 439/159 |
| 2009/0047834 A1* | 2/2009 | Ting | .............................. 439/630 |
| 2009/0298541 A1* | 12/2009 | Roh et al. | ..................... 455/558 |
| 2010/0105247 A1* | 4/2010 | Guo et al. | .................... 439/630 |
| 2010/0144179 A1* | 6/2010 | Guo et al. | .................... 439/159 |
| 2010/0216345 A1* | 8/2010 | Kiryu et al. | ................... 439/630 |
| 2010/0248551 A1* | 9/2010 | Harada | ........................ 439/636 |
| 2011/0003496 A1* | 1/2011 | Hu | ................................ 439/159 |

FOREIGN PATENT DOCUMENTS

CN 200987022 Y 12/2007

* cited by examiner

*Primary Examiner* — Alexander Gilman
(74) *Attorney, Agent, or Firm* — Wei Te Chung; Andrew C. Cheng; Ming Chieh Chang

(57) ABSTRACT

A stacked card connector (100) for receiving different cards comprises: a main base (1), a subbase (2) separately assembled to the main base (1) making repairing or changing the lower contacts easier and occupying less space, a bottom cover (42) placed in a bottom of the main base, and a top shell (41) enclosing the main base (1) and the subbase from a top side of the stacked card connector; the main base and the bottom cover defining a first space (11) with a first inserting opening (15), the subbase and the main base defining a second space (12) with a second inserting opening (16), the subbase and the top shell defining a third space (21) with a third inserting opening (24), the second inserting opening and the third inserting opening arranged in a side along a top-to-bottom direction, the first inserting opening arranged in a side perpendicular to the side where the second and third inserting opening are allocated.

18 Claims, 7 Drawing Sheets

STACKED CARD CONNECTOR

BACKGROUND OF THE INVENTION

1. Field of the Invention

The present invention generally relates to a card connector, and more particularly to a stacked card connector for receiving different cards.

2. Description of Related Arts

U.S. Pat. No. 6,857,907 discloses a stacked Secure Digital card connector. The card connector comprises an insulative housing, the insulative housing includes a bottom wall and a top cover, and a baffle united to the insulative housing defines two rooms for receiving different cards.

U.S. Pat. No. 7,114,993 discloses a card adapter. Two cards can be arrayed in a plane.

In the art of U.S. Pat. No. 6,857,907, changing contacts below the baffle needs to segregate apart the whole card connector, and in the art of U.S. Pat. No. 7,114,993, cards arrayed in a plane occupy a wide space.

Hence, a stacked card connector solving the problems is desired.

SUMMARY OF THE INVENTION

Accordingly, an object of the present invention is to provide a stacked card connector whose contacts are easy to change.

Another object of the present invention is to provide a stacked card connector that occupies less space.

To achieve the above objects, a stacked card connector is supplied. The stacked card connector for receiving different cards comprising:
a main base receiving a first set of contacts and a second set of contacts;
a subbase separately assembled to the main base, and receiving a third set of contacts;
a bottom cover placed in a bottom of the main base; and
a top shell enclosing the main base and the subbase from a top side of the stacked card connector;
wherein the main base and the bottom cover define a first space with a first inserting opening, the subbase and the main base define a second space with a second inserting opening, the subbase and the top shell define a third space with a third inserting opening, the second inserting opening and the third inserting opening arranged in a side along a top-to-bottom direction, the first inserting opening arranged in a side perpendicular to the side where the second and third inserting opening are allocated.

As has been described above, the subbase separately assembling to the main base make repairing or changing the lower contacts easier. At the same time, the subbase assembled to the top of the main base occupies less space.

Other objects, advantages and novel features of the invention will become more apparent from the following detailed description when taken in conjunction with the accompanying drawings.

DETAILED DESCRIPTION OF THE PREFERRED EMBODIMENT

Figure 2:
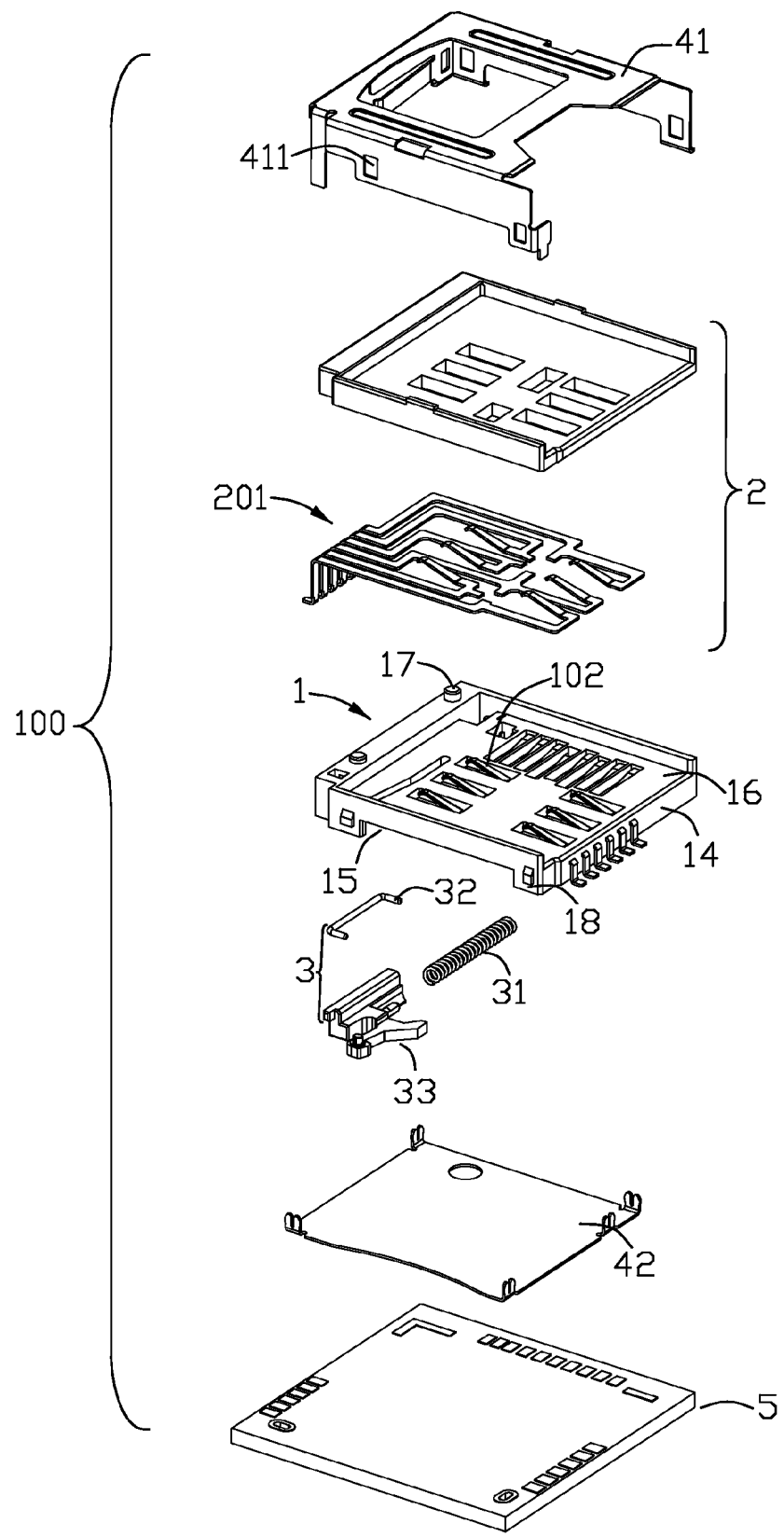
FIG. 2 is a perspective, exploded view of the stacked card connector.
Figure 3:
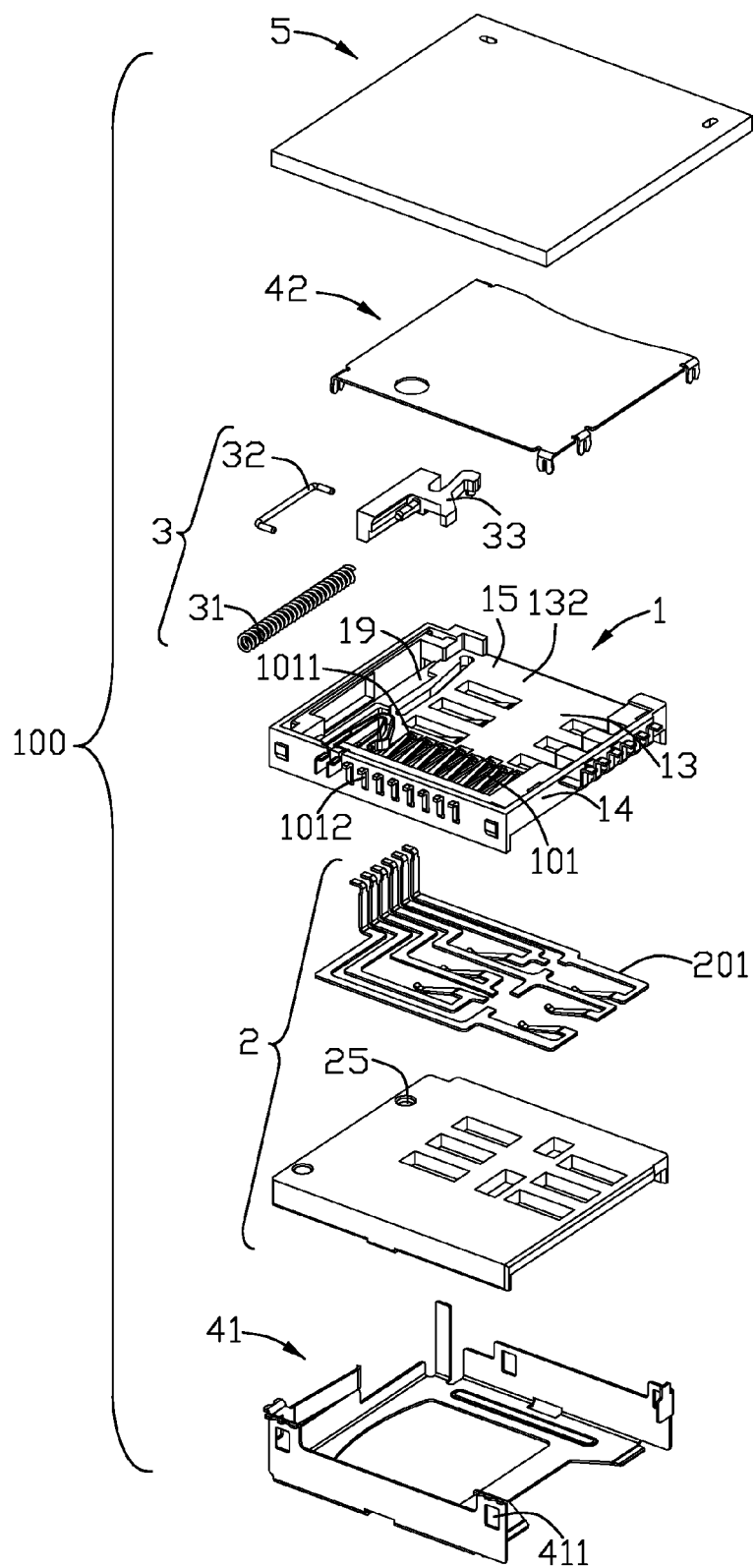
FIG. 3 is similar to FIG. 2, but viewed from another aspect.

Referring to FIGS. 2-3, a stacked card connector 100 comprises a main base 1, a subbase 2, a bottom cover 42, and a top shell 41.

The main base 1 and the bottom cover 42 define a first space 11 receiving a card C. The main base 1 and the subbase 2 define a second space 12 receiving a card A. The top shell 41 encloses the main base 1 and the subbase 2. The top shell 41 and the subbase 2 define a third space 21 receiving a card B.

The main base 1 receives a first set of contacts 101 having a first contact portion 1011 extending beyond a bottom face 132 of the main base 1. The main base 1 also receives a second set of the contacts 102 having a second contact portion 1021 extending beyond a top face 131 of the main base 1. The main base 1 has a bottom wall 13 and four lateral walls 14. A first inserting opening 15 is formed by the bottom wall 13 and four lateral walls 14 in a downward direction, and a second inserting opening 16 is formed by the bottom wall 13 and four lateral walls 14 in an upward direction. The first inserting opening 15 is oriented in a first direction, and the second inserting opening 16 is oriented in a second direction perpendicular to the first direction. A tenon 17 is extended from a lateral wall 14 in a top-to-bottom direction, a projection 18 is extended from another lateral wall 14 in a direction perpendicular to the top-to bottom direction.

Figure 4:
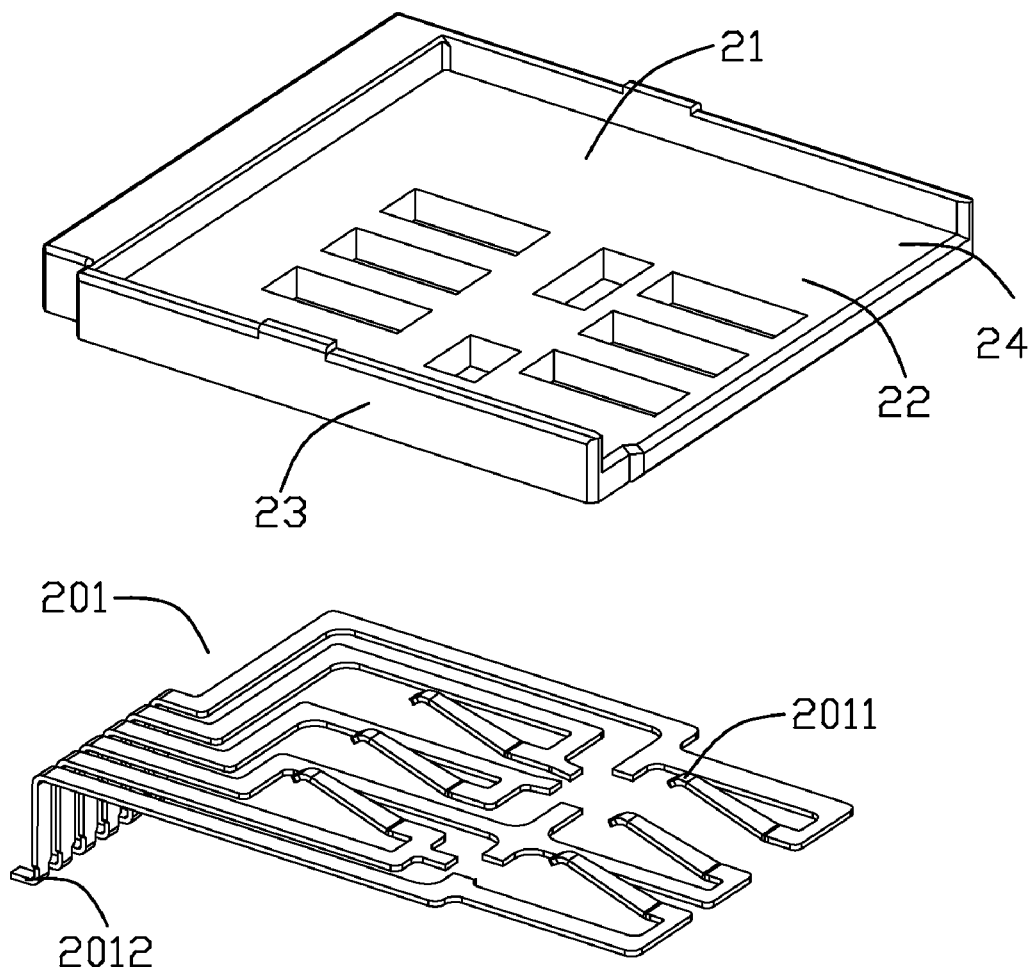
FIG. 4 is a perspective, exploded view of a subbase.
Figure 5:
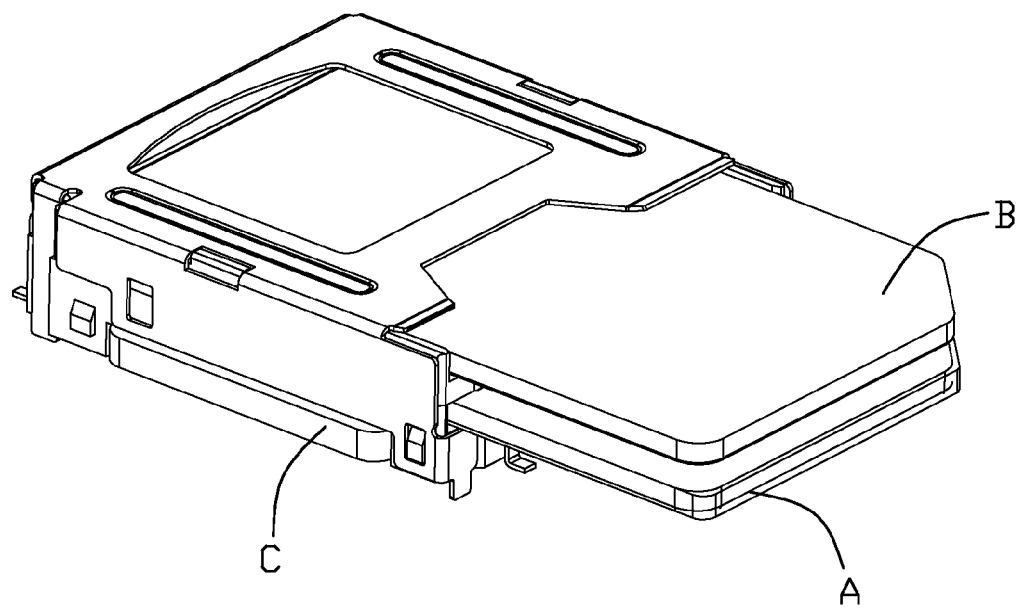
FIG. 5 is a perspective, stated view of inserting cards.
Figure 6:
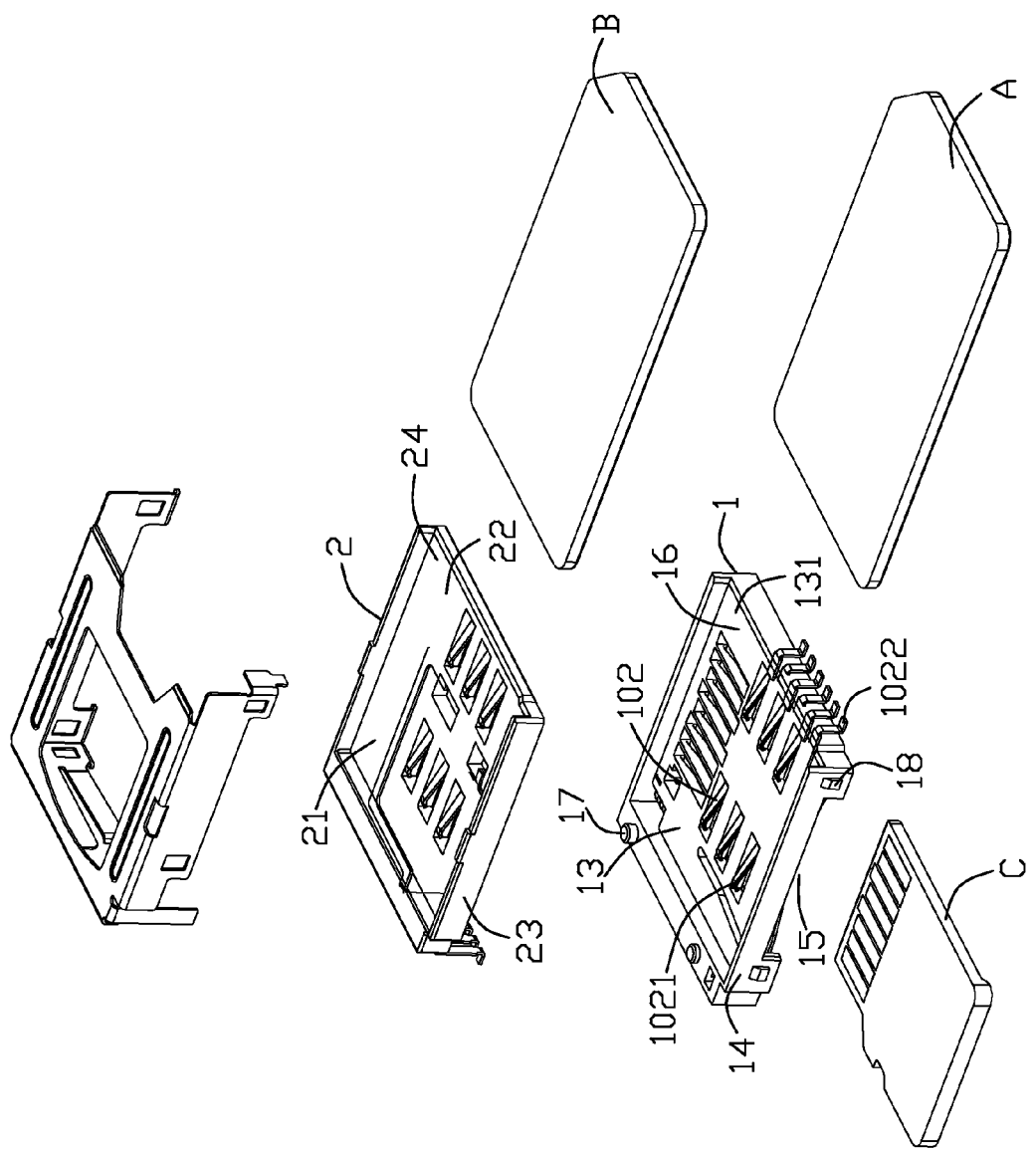
FIG. 6 is similar to FIG. 5, but viewed from the other state.
Figure 7:
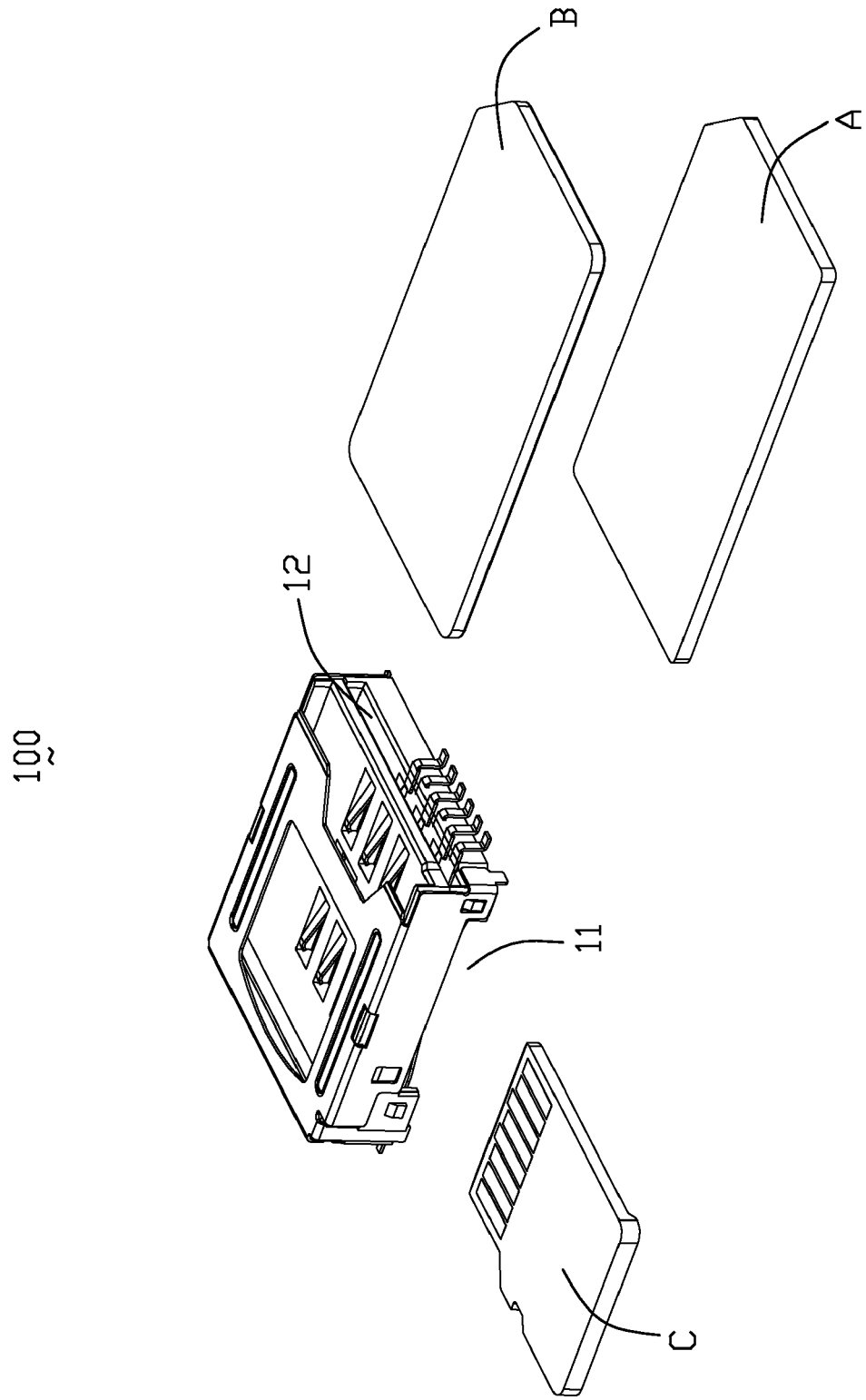
FIG. 7 is similar to FIG. 5, but viewed from another state.

Referring to FIG. 4, the subbase 2 has a third set of contacts 201 with a third contact portion 2011 extending beyond the subbase 2. The subbase 2 comprises a bottom wall 22 and four lateral walls 23. The bottom wall 22 and the four lateral walls 23 define a third inserting opening 24. The third inserting opening 24 is oriented in a same direction as the second direction. The subbase 2 has a hole 25 receiving the tenon 17.

The first set of contacts 101 also has a first soldering portion 1012, the second set of contacts 102 also has a second soldering portion 1022, and the third set of contacts 201 also has a third soldering portion 2012. The first soldering portion 1012, the second soldering portion 1022, and the third soldering portion 2012 are arranged in different sides of the main base 1.

An ejector 3 comprises a spring 31, a lever 32, and a block 33. The main base 1 has a guide passageway 19. The ejector 3 is placed between the bottom cover 42 and the main base 1. The ejector 3 has a stable state positioned in a front place and a stable state positioned in a rear place, and the ejector 3 circularly changes the state by the spring 31.

Figure 1:
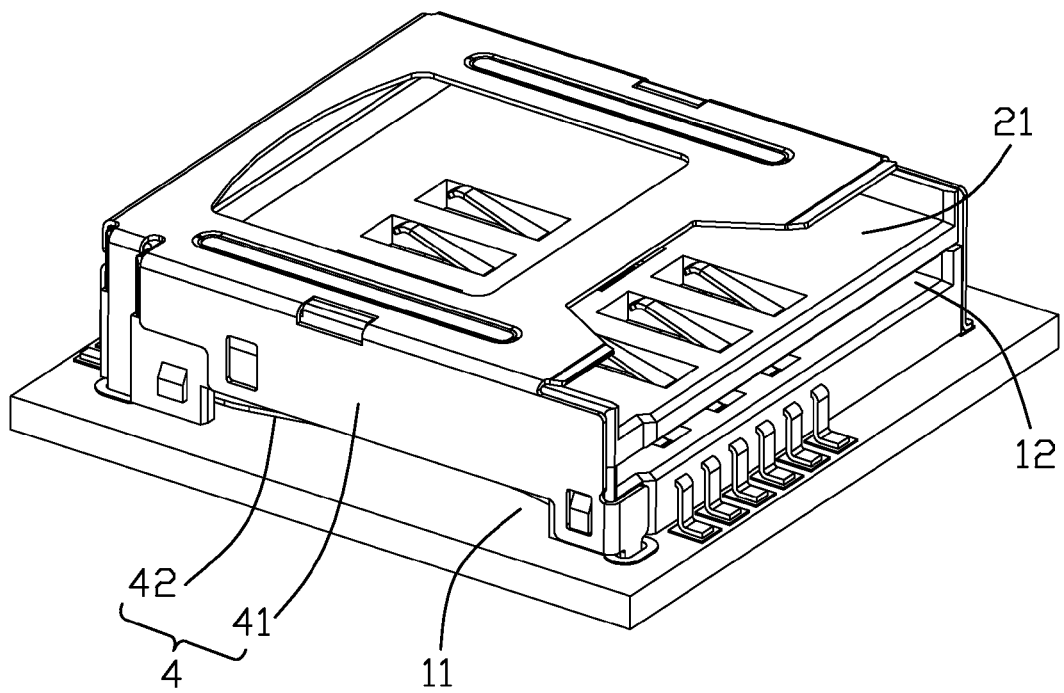
FIG. 1 is a perspective, assembled view of a stacked card connector.

The top shell 41 and the bottom cover 42 form a case 4 shown in FIG. 1. The top shell 41 has a slot 411 receiving the projecting 18.

In assembling process, first assemble the ejector 3 to the main base 1, then push the bottom cover 42 into the main base 1, after that mate the subbase 42 with the main base 41 by the tenon 17 and the hole 25, and lastly cover the top shell 41. The card connector 100 is usually soldered to a board 5.

In the present invention, the subbase that is separably assembled to the main base makes repairing or changing the lower contacts easier. At the same time, the subbase assembled to the top of the main base occupies less space.

Referring to FIGS. 1 and 5-7, different states of inserting cards are shown. The same kind of cards has a common inserting direction, thus preventing the cards from inserting incorrectly.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A stacked card connector for receiving different cards, comprising:
   a main base receiving a first set of contacts and a second set of contacts;
   a subbase separately assembled to the main base and receiving a third set of contacts;
   a bottom cover placed at a bottom of the main base; and
   a top shell enclosing the main base and the subbase from a top side thereof;
   wherein the main base and the bottom cover define a first space with a first inserting opening, the subbase and the main base define a second space with a second inserting opening, and the subbase and the top shell define a third space with a third inserting opening, the second inserting opening and the third inserting opening arranged in a side along a top-to-bottom direction, the first inserting opening arranged in a side perpendicular to the side where the second and third inserting openings are allocated.

2. The stacked card connector as described in claim 1, wherein the first set of contacts extends beyond a bottom surface of the main base and the second set of contacts extend beyond a top surface of the main base.

3. The stacked card connector as described in claim 2, wherein an ejector is placed between the main base and the bottom cover.

4. The stacked card connector as described in claim 3, wherein the ejector has a stable state positioned in a front place and a stable state positioned in a rear place, the ejector having a spring for circularly changes the states.

5. The stacked card connector as described in claim 1, wherein the main base has a tenon, and the subbase has a hole receiving the tenon.

6. The stacked card connector as described in claim 1, wherein the second space and the third space receive cards of the same kind.

7. A stacked card connector comprising:
   a first insulative housing defining a first receiving space laterally communicating with an exterior in a first horizontal lateral direction for receiving a first type card;
   a second insulative housing stacked with the first housing in a vertical direction and defining a second receiving space laterally communicating with the exterior in a second horizontal lateral direction for receiving a second type card;
   a third receiving space formed between the first housing and the second housing in said vertical direction laterally communication with the exterior in a third horizontal lateral direction for receiving a third type card;
   the first type card being different from the second type card while the third type card is same with said first type card;
   said first horizontal lateral direction being different from said second horizontal lateral direction while said third horizontal lateral direction is same with said first horizontal lateral direction;
   a first set of contacts extending into the first receiving space;
   a second set of contacts extending into the second receiving space;
   a third set of contacts extending into the third receiving space;
   said first set of contacts and the second set of contacts being of different kinds while the third set of contacts is of a same kind with the first set of contacts; wherein
   said third set of contacts defines a contacting area essentially in alignment with that defined by the first set of contacts in the vertical direction.

8. The stacked card connector as claimed in claim 7, wherein the first horizontal lateral direction is perpendicular to said second horizontal lateral direction.

9. The stacked card connector as claimed in claim 7, wherein the first receiving space is located above the second receiving space and the third receiving space.

10. The stacked card connector as claimed in claim 7, wherein a first metallic shell and a second metallic shell vertically cover the first receiving space and the second receiving space, respectively.

11. The stacked card connector as claimed in claim 7, wherein solder tails of the first set of contacts and those of the third set of contacts are located on opposite first and second sides of the stacked card connector.

12. The stacked card connector as claimed in claim 11, wherein solder tails of the second set of contacts are located on a third side of the stacked card connector perpendicular to said opposite first and second sides.

13. The stacked card connector as claimed in claim 12, whether third receiving space directs to said second side along said third horizontal lateral direction.

14. The stacked card connector as claimed in claim 12, wherein the second receiving space directs to the third side in a fourth horizontal lateral direction opposite to said third horizontal lateral direction.

15. A stack card connector comprising:
   an insulative housing;
   six contacts including first, second and third contacts arranged in a first row, and fourth, fifth and sixth contacts arranged in a second row, each of said contacts including an upward resilient contact section, a solder section and a connecting section therebetween, all said solder sections being arranged in one row, the contact sections of the contacts in the first row being farther than the contact sections of the contacts in the second row with regard to the solder sections;
   the contact section of the first contact being aligned with that of the fourth contact in a front-to-back direction, the contact section of the second contact being aligned with that of the fifth contact in the front-to-back direction, the contact section of the third contact being aligned with that of the sixth contact in the front-to-back direction;
   the connecting section of the first contact and that of the third contact being located by opposite sides of the contacts of the second row in a lateral direction perpendicular to said front-to-back direction, while the connecting section of the second contact is located between the fourth contact and the fifth contact in said lateral direction.

16. The stacked card connector as claimed in claim 15, wherein each of said six contacts defines, in a top view, a 7-like front end region including the corresponding resilient contact section, under condition that the 7-like front end regions of the first and second contacts face to the lateral direction while that of the third contact faces to another lateral direction opposite to said lateral direction; the 7-like front end region of the fourth contact faces to the lateral direction while those of the fifth and sixth contacts face to said another lateral direction.

17. The stacked card connector as claimed in claim 16, wherein said housing defines a first opening to remove linking among the first, second and fourth contacts.

18. The stacked card connector as claimed in claim 17, wherein said housing further defines a second opening to remove linking among the second, third, fifth and sixth contacts.

* * * * *